US009469411B2

(12) United States Patent
Taurand et al.

(10) Patent No.: US 9,469,411 B2
(45) Date of Patent: Oct. 18, 2016

(54) POWER SUPPLY SYSTEM WITH HETEROGENEOUS MULTIPLE INPUT

(71) Applicant: THALES, Neuilly Sur Seine (FR)

(72) Inventors: Christophe Taurand, Valence Cedex (FR); Stefan Mollov, Valence Cedex (FR)

(73) Assignee: THALES, Neuilly sur Seine (FR)

( * ) Notice: Subject to any disclaimer, the term of this patent is extended or adjusted under 35 U.S.C. 154(b) by 829 days.

(21) Appl. No.: 13/730,120

(22) Filed: Dec. 28, 2012

(65) Prior Publication Data
US 2013/0187472 A1   Jul. 25, 2013

(30) Foreign Application Priority Data

Dec. 30, 2011  (FR) ...................................... 11 04157

(51) Int. Cl.
*H02J 7/00* (2006.01)
*H02J 9/00* (2006.01)
(Continued)

(52) U.S. Cl.
CPC ................. *B64D 41/00* (2013.01); *H02J 1/00* (2013.01); *H02J 1/10* (2013.01); *H02J 7/345* (2013.01); *H02J 9/061* (2013.01); *H02M 1/10* (2013.01); *B64D 2221/00* (2013.01); *Y10T 307/625* (2015.04); *Y10T 307/658* (2015.04)

(58) Field of Classification Search
CPC ............ B64D 41/00; H02J 1/00; H02J 9/00; Y10T 307/625
USPC .......................................................... 307/66
See application file for complete search history.

(56) References Cited

U.S. PATENT DOCUMENTS

2005/0134239 A1   6/2005   Harris et al.
2008/0150356 A1   6/2008   Breit et al.
(Continued)

FOREIGN PATENT DOCUMENTS

EP        2163909        3/2010
EP        2363940        9/2011
(Continued)

OTHER PUBLICATIONS

French Search Report dated Jun. 6, 2012 filed in counterpart French Application No. 1104157, 8 pages.

*Primary Examiner* — Carlos Amaya
(74) *Attorney, Agent, or Firm* — Patterson & Sheridan, LLP (57) ABSTRACT

The invention relates to a power supply system that is adapted be connected in input to N distinct power supply grids ($R_1, \ldots, R_N$) delivering a direct or alternating input voltage ($V_1, V_N$) and to deliver a direct distribution voltage ($V_{BUS}$), N being an integer greater than or equal to 2, of the type comprising a distribution bus operating under the distribution voltage ($V_{BUS}$), N unidirectional converters ($C_1, \ldots, C_N$) that can respectively be connected in input to a given power grid ($R_1, \ldots, R_N$), and control means capable of controlling the unidirectional converters ($C_1, \ldots C_N$). The power supply system also includes an energy storage device connected to the distribution bus and having a quantity of energy (E), and the control means are adapted to control the unidirectional converters ($C_1, \ldots C_N$) simultaneously to regulate the electrical power ($P_1, \ldots P_N$) delivered by each of said unidirectional converters ($C_1, \ldots, C_N$) as a function of the quantity of energy (E).

16 Claims, 5 Drawing Sheets

(51) Int. Cl.
  *B64D 41/00* (2006.01)
  *H02M 1/10* (2006.01)
  *H02J 1/10* (2006.01)
  *H02J 7/34* (2006.01)
  *H02J 9/06* (2006.01)
  *H02J 1/00* (2006.01)

(56) References Cited

U.S. PATENT DOCUMENTS

2009/0027932 A1* 1/2009 Haines ............... H02J 9/062
                                                                363/95
2011/0273012 A1  11/2011 Tardy
2011/0305050 A1* 12/2011 Krein ............... H02J 3/1835
                                                                363/39
2013/0088081 A1*  4/2013 Siri ................. H02J 3/383
                                                                307/46

FOREIGN PATENT DOCUMENTS

| FR | 2815789 | 4/2002 |
| FR | 2931801 | 12/2009 |
| FR | 2936221 | 3/2010 |
| WO | 97/21265 | 6/1997 |
| WO | 20061024007 | 3/2006 |
| WO | 2009/125007 | 10/2009 |

* cited by examiner

POWER SUPPLY SYSTEM WITH HETEROGENEOUS MULTIPLE INPUT

BACKGROUND OF THE INVENTION

1. Field of the Invention

The present invention relates to a power supply system with heterogeneous multiple inputs, i.e. connected in input to a plurality of electrical power grids delivering direct or alternating current.

More particularly, the invention relates to a power supply system adapted to be connected in input to N distinct power grids delivering a direct or alternating input voltage and to deliver a direct distribution voltage, N being an integer greater than or equal to 2, comprising:
- a distribution bus operating under the distribution voltage,
- N unidirectional converters that can respectively be connected in input to a given power grid and able to deliver an electrical power to the distribution bus, and
- control means capable of controlling the unidirectional converters.

This type of power supply is particularly used in aeronautics, and is designed to provide regulated voltage to the onboard electronic circuits of an aircraft.

These power supplies are thus subject to a number of specific constraints.

For example, they must be able to switch from a priority power supply grid to a redundant power supply grid in a secured manner—i.e. while avoiding any exchange of energy between said grids—, with well-controlled transitional phases without oscillations in the context of increasing the dynamics and impedance of those power supply grids. The withdrawal of power from grids other than the priority grid must also be minimized.

Furthermore, they must make it possible to withdraw a normal-operation voltage on each of the redundant power supply grids to power auxiliary electronic equipment.

These power supply systems must also make it possible to withstand power line disturbances occurring on the selected power supply grid and allow filtering of inrush currents coming from the downstream electronic equipment.

Lastly, they must be able to operate from power supply grids delivering electrical power supplies having very different formats, for example whereof the supplied current is direct for some and alternating for others, whereof the voltage and/or frequency is different, and which are not connected to a same ground potential.

2. Description of the Related Art

FR 2 815 789 describes a power supply system of the aforementioned type capable of selecting a power supply grid from among a plurality of power supply grids. The switching logic between the power supply grids is rigid and implemented by a dedicated control member capable of ordering opening or closing of the contacts of a diode switch as a function of the voltage delivered by each of the converters.

US 2005/134239 also describes a power supply system of the aforementioned type. In that document, various topologies are considered, in which direct or alternating voltages delivered by distinct power supply grids are combined in order to supply a load situated downstream of the power supply system.

However, these solutions are not fully satisfactory.

In fact, in the current context of increasing dynamics of the power supply grids, the rigidity of the switching logic of the power supply system described in the first document involves frequent and abrupt switches between the power supply grids, as well as low-voltage operating phases of the unidirectional converters. These converters are then strongly biased and the redundant power supply grids are called on more than is strictly necessary. This in particular results in disruptions of the distribution voltage delivered to the electronic equipment situated downstream.

In the second cited document, the power supply system cannot make a prioritized selection of the power supply grids. Furthermore, it is not adapted to filter the inrush currents coming from the equipment situated downstream.

SUMMARY OF THE INVENTION

One aim of the invention is to resolve these problems.

To that end, the invention relates to a power supply system adapted to be connected in input to N distinct power supply grids delivering a direct or alternating input voltage and to deliver a direct distribution voltage, N being an integer greater than or equal to 2, of the type comprising:
- a distribution bus operating under the distribution voltage,
- N unidirectional converters that can respectively be connected in input to a given power grid and able to deliver electrical power to the distribution bus,
- control means capable of controlling the unidirectional converters, characterized in that the power supply system also includes an energy storage device connected to the distribution bus and having a quantity of energy, and in that the control means are adapted to control the unidirectional converters simultaneously to regulate the electrical power delivered by each of said unidirectional converters as a function of the quantity of energy.

According to other aspects of the invention, the invention comprises one or more of the following features, considered alone or according to all technically possible combinations, and in which:
- the energy storage device is a capacitive storage device operating under a storage voltage representative of the quantity of energy, the control means being adapted to control the unidirectional converters simultaneously to regulate the electrical power delivered by each of said unidirectional converters as a function of the storage voltage;
- the energy storage device is an inductive storage device passed through by a storage current, the control means being able to control the unidirectional converters simultaneously to regulate the electrical power delivered by each of said unidirectional converters as a function of the storage current;
- decreasing storage voltage thresholds are associated with the power supply grids and define a priority order between said power supply grids such that a first power supply grid, whereof the storage voltage threshold is higher than the storage voltage threshold of a second power supply grid, is given a higher priority relative to said second power supply grid;
- the control means comprise N storage regulating loops respectively associated with a unidirectional converter and capable of regulating the electrical power delivered by said unidirectional converter to the distribution bus, each storage regulating loop comprising a progressive reduction control characteristic beyond a voltage threshold associated with the corresponding power supply grid, the slope of said progressive reduction corresponding to the static gain of said storage regulating loop;

the progressive reductions of the control characteristics of the N storage regulating loops are done over value ranges of the storage voltage that are disjoint from one another;

the maximum value of the control characteristic of a storage regulating loop is also the maximum value of the control characteristics of the N−1 other storage regulating loops;

the respective static gains of the N storage regulating loops have decreasing values, the static gain of a storage regulating loop whereof the unidirectional converter is associated with a first power supply grid being smaller than the static gain of the storage regulating loop whereof the unidirectional converter is associated with a power supply grid with a higher priority relative to said first power supply grid;

the static gain of a storage regulating loop whereof the unidirectional converter is associated with a first power supply grid is determined by the equation $G_i = G_{i-1} * V_{STi}/V_{STi-1}$, where $G_i$ is the static gain of said storage regulating loop, $V_{STi}$ is the storage voltage threshold associated with said first power supply grid, $V_{STi-1}$ is the smallest of the storage voltage thresholds higher than the storage voltage threshold $V_{STi}$, and $G_{i-1}$ is the static gain of the storage regulating loop whereof the unidirectional converter is associated with the power supply grid whereof the storage voltage threshold is $V_{STi-1}$;

the control means have N distribution regulating loops respectively associated with a given unidirectional converter and capable of regulating the electrical power delivered by said unidirectional converter to the distribution bus as a function of the distribution voltage to limit the distribution voltage or to limit a distribution current supplied to the distribution bus;

each unidirectional converter associated with a given power supply grid has:

an intermediate grid, a unidirectional primary converter capable of preventing electrical power transfers between the power supply grid with which said unidirectional converter is associated and the other power supply grids, said unidirectional primary converter being connected in input to the corresponding power supply grid and capable of delivering to the intermediate grid a regulated intermediate voltage from the input voltage of said power supply grid, and a bidirectional insulator capable of galvanically insulating the power supply grid with which said unidirectional converter is associated from the other power supply grids, said bidirectional insulator being connected in input to the intermediate grid and at its output to the distribution bus, and being capable of being controlled by the control means to regulate the electrical power delivered by the unidirectional converter to the distribution bus and to regulate electrical power coming from the distribution bus and delivered by said bidirectional insulator to the corresponding intermediate bus;

the primary converters include rectifier means for the voltage, filtering means for the voltage in common mode and differential mode, protection means against overvoltages, and protection means against lightning;

the control means have N positive reaction loops respectively associated with a given bidirectional insulator and capable of regulating, as a function of the intermediate voltage of the corresponding intermediate grid, the electrical power delivered by said bidirectional insulator to the distribution bus, and therefore by the corresponding unidirectional converter to the distribution bus, on the one hand, and the electrical power delivered by said bidirectional insulator to the corresponding intermediate bus on the other hand;

for each unidirectional converter, the associated storage regulating loop is capable of regulating the electrical power delivered by said unidirectional converter as a function of the storage voltage via a first control variable, the associated distribution regulating loop is capable of regulating the electrical power delivered by said unidirectional converter as a function of the distribution voltage via a second control variable, and the associated positive reaction loop is capable of regulating the electrical power delivered by said unidirectional converter via a third control variable, the power delivered by said unidirectional converter to the distribution bus being proportional to the difference between the minimum of the first and second control variables on the one hand, and the third control variable on the other hand;

the energy storage device is connected to the distribution bus via a two-way loader capable of transferring electric energy between the distribution bus and the energy storage device; and the energy storage device comprises a loader regulating loop capable of controlling the two-way loader to regulate the energy transfer between the two-way loader and the distribution bus to slave the distribution voltage to a reference distribution voltage.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

The invention will be better understood upon reading the following description, provided solely as an example, and done in reference to the appended drawings, in which.

DETAILED DESCRIPTION

Figure 1:
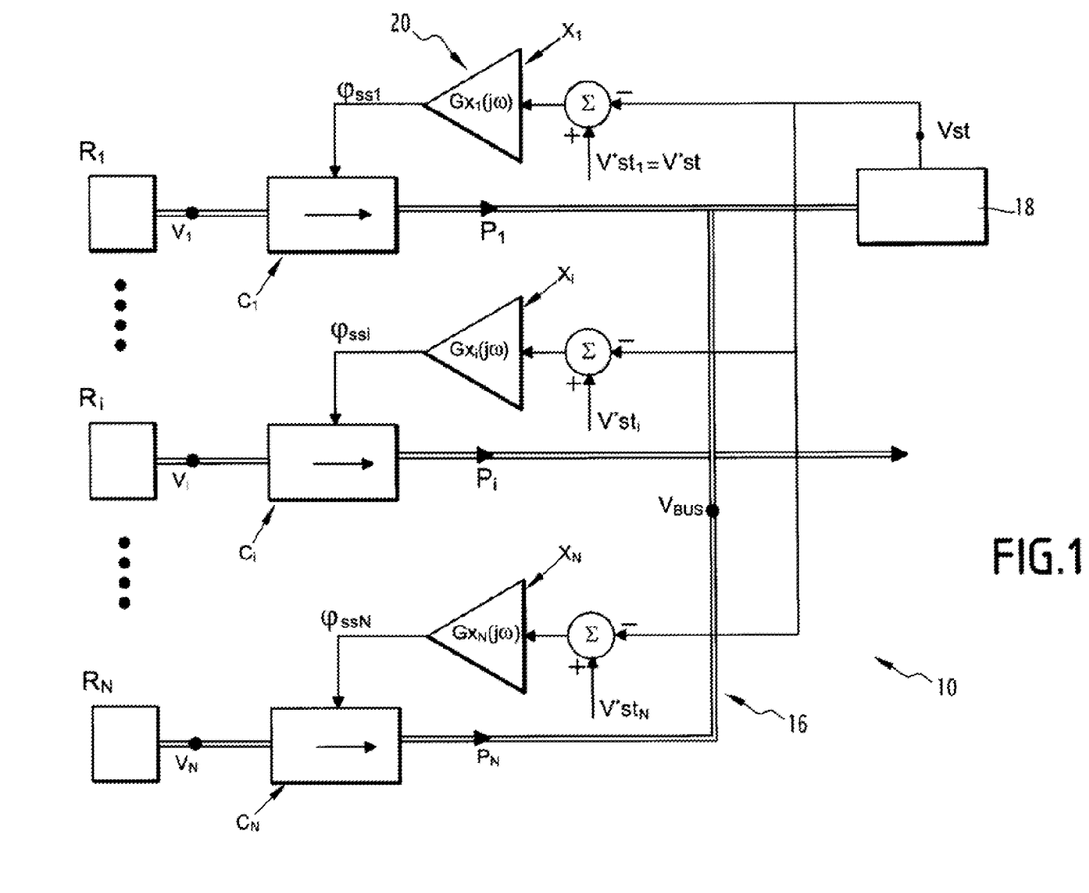
FIG. 1 is a diagrammatic illustration of a power supply system according to a first embodiment of the invention.

In reference to FIG. 1, which illustrates a first embodiment of the invention, the power supply system 10 with heterogeneous multiple inputs, hereafter "power supply system 10" or "system 10," is adapted to be connected in input to N power supply grids $R_i$, N being an integer greater than or equal to 2 and where i is an integer comprised between 1 to N, preventing electric energy transfers between the power supply grids $R_i$ and delivering a direct and regulated distribution voltage $V_{BUS}$ to electronic equipment situated downstream from the input voltages $V_1, \ldots V_N$ delivered by the power supply grids $R_i$.

To provide the distribution voltage $V_{BUS}$, the system 10 is capable of drawing electrical energy from the power supply grids $R_i$ according to a priority order between those grids. This priority order is described in more detail below. The drawing of electrical energy is done in a secured manner, without any energy exchange between the power supply grids $R_i$, and so as to minimize the electrical energy withdrawn from the power supply grids $R_i$ other than the priority power supply grid.

Furthermore, the system 10 is adapted to withstand power disruptions or disappearances of the input voltage $V_i$ of the power supply grid $R_i$ currently selected, and to filter the inrush currents coming from the electronic equipment situated downstream.

To that end, the system 10 has N unidirectional converters $C_1, \ldots, C_N$, a distribution bus 16, and an energy storage device 18. The power supply system 10 also has control means 20 for controlling the N unidirectional converters $C_i$.

The power supply grids $R_i$ deliver electricity in various formats. For example, certain currents delivered by the power supply grids $R_i$ are direct and the corresponding input voltage $V_i$ is 28 V or 270 V, and the current coming from other power supply grids $R_i$ is alternating and the input voltage $V_i$ is for example 115 V or 230 V, and its frequency is comprised in the range 46 Hz-800 Hz.

In the example of FIG. 1, the system 10 is connected to N power supply grids $R_1, \ldots, R_N$, some of which are powered by alternators and others of which are powered by batteries. The input voltages $V_1, \ldots, V_N$ then have significant dynamics, the impedances of the grids $R_i$ also being significant. This imposes a voltage profile on the inputs of the converters $C_i$ that is very dynamic and not very controlled.

The unidirectional converters $C_i$ are adapted to prevent any transfer of electrical energy between the power supply grids $R_i$ and to respectively deliver a regulated electrical power $P_1, \ldots, P_N$ to the distribution bus 16 from an input voltage $V_1, \ldots, V_N$.

To that end, each unidirectional converter $C_i$ is adapted to be connected in input to a given power supply grid $R_i$ and is connected at its output to the distribution bus 16.

Each unidirectional converter is also adapted to be controlled by the control means 20 to regulate the electrical power $P_1, \ldots, P_N$ that it delivers to the distribution bus 16, as will be seen hereafter.

Furthermore, each unidirectional converter $C_i$ connected to a power supply grid $R_i$ supplying an alternating current is capable of rectifying the current so as to deliver a direct current to the distribution bus 16.

Alternatively, each unidirectional converter $C_i$ is also capable of galvanically insulating the power supply grid $R_i$ to which it is connected from the other power supply grids $R_1, \ldots, R_N$.

In a known manner, such converters 14 are for example made by converters of the "Flyback" type known by those skilled in the art.

The distribution bus 16 is adapted to ensure the transfer of energy between the power supply grids $R_i$ and the electronic equipment situated downstream of the power supply system.

To that end, as previously indicated, the outputs of the unidirectional converters $C_i$ are all connected to the distribution bus 16, which operates under a distribution voltage $V_{BUS}$. The downstream electronic equipment is then connected to the distribution bus 16 directly, or is connected thereto via a secured switch (not shown) and/or one or more power converters.

The distribution voltage $V_{BUS}$ is adapted to be slaved to a reference distribution voltage $V^*_{BUS}$ and to be kept below a maximum value $V_{BUS\_MAX}$ via the control of the unidirectional converters, as will be seen hereafter.

In the example of FIG. 1, the reference distribution voltage $V^*_{BUS}$ is for example equal to 12 V.

The energy storage device 18 is capable of storing electrical energy coming from the distribution bus 16 and returning the stored electrical energy to the distribution bus 16, as well as allowing the power supply system 10 to withstand power disruptions or disappearances of the input voltages $V_1, \ldots, V_N$.

Furthermore, it is adapted to filter load pulsations resulting from electrical power inrushes done by the downstream electronic equipment. In fact, the frequencies of the load pulsations are generally of a much higher order of magnitude than that of the frequency of the charge-discharge cycles of the energy storage device 18, which is the decisive one for controlling the unidirectional converters $C_i$. The load pulsations are then attenuated for the power supply grids $R_i$, as will be seen hereafter.

The energy storage device 18 is connected to the distribution bus 16 and operates under a storage voltage $V_{ST}$.

In the embodiment of FIG. 1, the energy storage device 18 is a capacitive device, the storage voltage $V_{ST}$ being representative of a quantity of electrical energy E that it contains. The storage voltage $V_{ST}$ is regulated at a stipulated storage voltage $V^*_{ST}$. For example, the value of the stipulated storage voltage $V^*_{ST}$ is equal to 90 V.

The control means 20 are adapted to simultaneously control the unidirectional converters $C_i$ to regulate the electrical powers $P_1, \ldots, P_N$ delivered by those converters to the distribution bus 16 as a function of the quantity of electrical energy E.

In the example of FIG. 1, the control means 20 are capable of controlling the unidirectional converters $C_i$ to regulate the electrical powers $P_1, \ldots, P_N$ delivered by those converters to the distribution bus 16 as a function of the storage voltage $V_{ST}$.

The control of these unidirectional converters $C_i$ by the control means 20 implements a regulating algorithm of the electrical powers $P_1, \ldots, P_N$ delivered as a function of the storage voltage $V_{ST}$, as will be seen hereafter.

The control means 20 comprise N storage regulating loops $X_1, \ldots, X_N$. Each storage regulating loop $X_i$ is respectively associated with a given unidirectional converter $C_i$.

Each storage regulating loop $X_i$ is adapted to command the corresponding unidirectional converter $C_i$ from the measurement of the storage voltage $V_{ST}$.

N storage voltage thresholds $V_{ST1}, \ldots, V_{STN}$ are respectively associated with the N power supply grids $R_1, \ldots, R_N$.

These storage voltage thresholds $V_{ST1}, \ldots, V_{STN}$ are decreasing and define a priority order between the power supply grids $R_i$ such that the reference storage voltage threshold $V_{STi}$ power supply grid $R_i$ has priority relative to the power supply grids $R_{STi+k}$ whereof the reference storage voltages $V_{STi+k}$ are smaller, k being an integer comprised between 1 and N–i.

The control means 20 are then adapted to command the corresponding unidirectional converter $C_i$ as a function of the storage voltage $V_{ST}$ so that the electrical power transferred to the distribution bus 16 by the power supply grids $R_i, \ldots, R_N$ among which said power supply grid $R_i$ has priority preferably comes from the power supply grid $R_i$, as will be seen later.

The control of the unidirectional converters $C_i$ is done by each storage regulating loop $X_i$ via a first control variable $\phi_{SSi}$ that is a function of the storage voltage $V_{ST}$.

Figure 4:
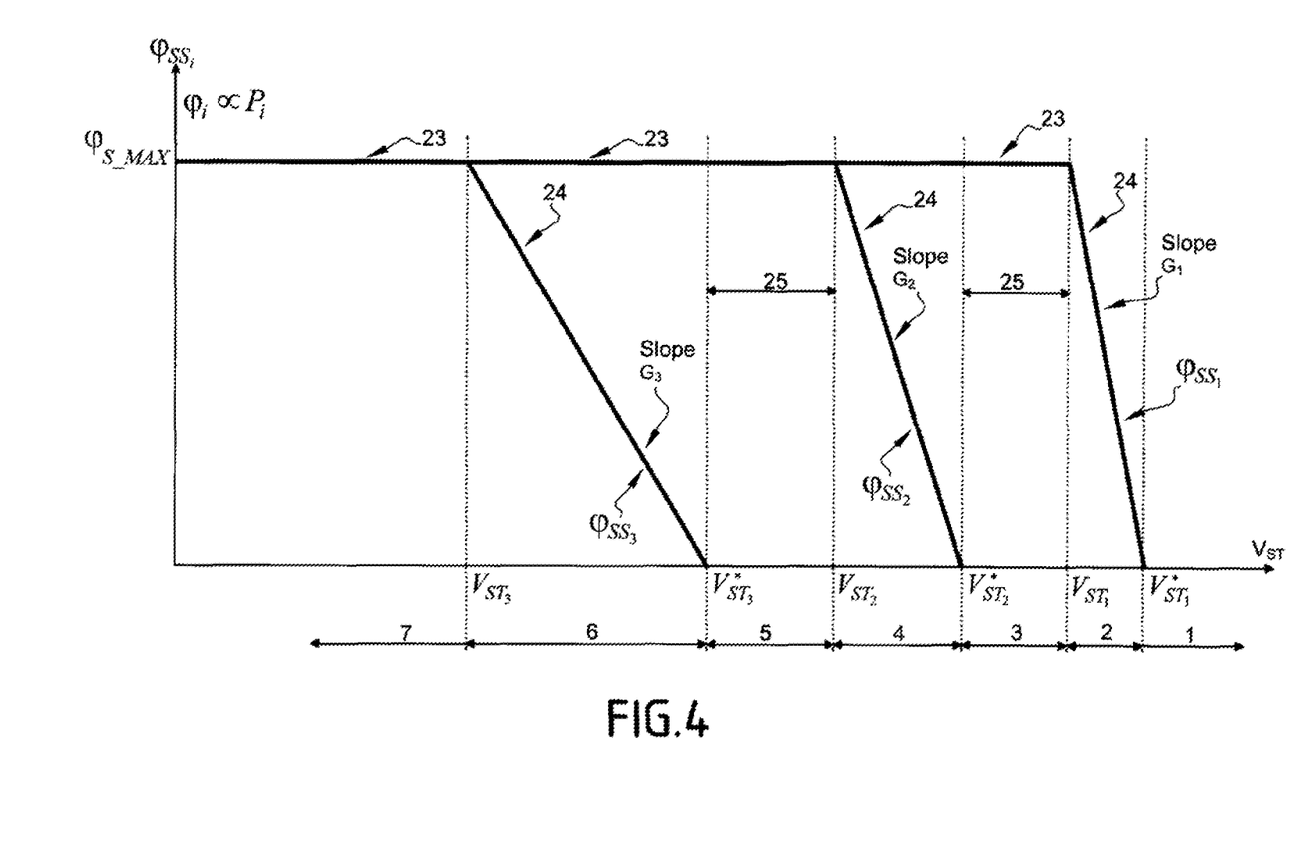
FIG. 4 is a diagram illustrating control characteristics of storage regulating loops of the invention.

In reference to FIG. 4, which illustrates the control characteristics 23 of the storage regulating loops $X_i$ in the case where N is equal to 3, the control characteristics 23, i.e. the functions determining the first control variable $\phi_{SS1}, \ldots, \phi_{SSN}$ of the corresponding regulating loops $X_1, \ldots, X_N$ as a function of the storage voltage $V_{ST}$, each have a progressive reduction 24 of transferred power, the progressive reductions 24 of the various control characteristics 23 being done on ranges of values of the storage voltage $V_{ST}$ that are disjoint from one another.

The slopes of the progressive reductions 24 respectively correspond to the static gain $G_i$ of the corresponding storage regulating loop $X_i$.

The control characteristic 23 of a given storage regulating loop $X_i$ has a storage cut-off voltage equivalent to the storage voltage threshold $V_{STi}$ associated with the corresponding power supply grid $X_i$.

The control characteristics 23 have a common maximum $\phi_{S\_MAX}$ that corresponds to the command of a maximal electrical power transfer $P_i$ between the considered power supply grid $R_i$ and the distribution bus 16.

It should be noted that when the first control variable $\phi_{SSi}$ is equal to $\phi_{S\_MAX}$, the unidirectional converter $C_i$ is commanded for a maximal transfer of electrical power $P_i$, but the electrical power transferred to the distribution bus can be zero. This is for example the case when the corresponding input voltage $V_i$ is zero.

Each power supply grid $R_i$ has an associated reference storage voltage $V^*_{STi}$ of the power supply grid $R_i$ defined by: $V^*_{STi}=V_{STi}+\phi_{S\_MAX}/G_i$, where $G_i$ is the static gain of the storage regulating loop $X_i$, $\phi_{S\_MAX}$ is the maximum of the control characteristics 23 of the distribution regulating loops $X_i$, and $V_{STi}$ is the storage voltage threshold of the power supply grid $R_i$.

The reference storage voltage $V^*_{STi}$ of the power supply grid $R_i$ is then the value of the storage voltage at which the storage voltage $V_{ST}$ is stipulated when the storage voltage $V_{ST}$ is over the value range of the progressive reduction 24 of the control characteristic 23 of the distribution regulating loop $X_i$.

The reference storage voltage $V^*_{STi}$ corresponds to the minimum of the values of the storage voltage $V_{ST}$ at which the first control variable $\phi_{SSi}$ is equal to 0, i.e. at which the unidirectional converter $C_i$ is commanded by the control means 20 to transfer zero electrical power $P_i$ to the distribution bus 16.

The closed-loop control of the storage voltage $V_{ST}$ to that value $V^*_{STi}$ thus makes it possible to minimize the withdrawal of electrical energy on the corresponding power supply grid $R_i$.

The value range on which the progressive reduction 24 of the control characteristic 23 of the regulation loop $X_i$ is done is thus $[V_{STi}; V^*_{STi}]$, with $V^*_{ST1}$ equal to $V^*_{ST}$. This value range thus defines an operating region of the system 10 associated with the reference power supply grid $R_i$.

The progressive reductions 24 of the control characteristics 23 are separated from one another by transparency ranges 25. The transparency ranges 25 are respectively associated with a given power supply grid $R_i$ and correspond to a quantity of energy that the energy storage device 18 can supply to the distribution bus 16 to supply the downstream electronic equipment upon disappearance of the input voltage $V_i$ of the corresponding power supply grid $R_i$, as will be seen hereafter.

The static gain $G_i$ of the storage regulating loop $X_i$ is determined by the equation: $G_i=G_{i-1}*V_{STi}/V_{ST-1}$, where $G_i$ is the static gain of the storage regulating loop $X_i$, $V_{STi}$ is the storage voltage threshold associated with the power supply grid $R_i$, $V_{STi-1}$ is the smallest of the storage voltage thresholds above the storage voltage threshold $V_{STi}$, and $G_{i-1}$ is the gain of the storage regulating loop whereof the unidirectional converter is associated with the power supply grid whereof the storage voltage threshold is $V_{STi1}$.

The static gains $G_i$ of the N storage regulating loops $X_i$ have decreasing values, the static gain $G_i$ of a storage regulating loop $X_i$ whereof the unidirectional converter $C_i$ is associated with a first power supply grid $R_i$ being smaller than the static gain $G_k$ of the storage regulating loops $X_i$ whereof the unidirectional converter $C_k$ is associated with a power supply grid $R_k$ with a higher priority relative to said first power supply grid $R_i$.

The higher the static gain $G_i$, the closer the storage voltage $V_{ST}$ is kept to the reference storage voltage $V^*_{STi}$ of the power supply grid $R_i$.

However, the higher the static gain $G_i$, the less the energy storage device 18 can filter the load pulsations. In fact, a high static gain $G_i$ translates to a compensation of the slightest variation of the storage voltage $V_{ST}$ through the modification of the electrical power $P_i$ delivered by its unidirectional converter $C_i$. In other words, the higher the static gain $G_i$, the more the load pulsations are visible for the corresponding power supply grid $R_i$.

Furthermore, when the storage voltage $V_{ST}$ decreases, the electricity contained in the storage means 18 available for filtering of the load pulsations decreases.

This translates to an increase in the current passing through the energy storage device 18 and significant variations of the storage voltage $V_{ST}$.

This voltage variation can be expressed in the following form for a sinusoidal load pulsation $I_{LOAD}$:

$$\Delta V_{ST} = \frac{V_{BUS}}{V_{ST}} \frac{I_{LOAD}}{Y_{Cst}}$$

Where $Y_{Cst}$ is the storage capacity of the energy storage device.

A better filtering of the load pulsations is then obtained by increasing the maximum storage capacity $Y_{Cst}$, or by relaxing the closed-loop control of the storage voltage $V_{ST}$ to the reference storage voltage $V'_{STi}$ of the power supply grid $R_i$, i.e. by decreasing the static gain $G_i$ of the corresponding regulating loop $X_i$.

The operation of the power supply system 10 according to the invention will now be described in reference to FIG. 4.

FIG. 4 illustrates the algorithm for regulating the electrical powers $P_1, \ldots, P_N$ 20 as a function of the storage voltage $V_{ST}$, the algorithm being carried out by the control means 20. The values of the storage voltage $V_{ST}$ are divided into regions (1 to 7).

The region 1 is a transient condition caused by the response time of the regulating loops, as will be seen hereafter.

In this region 1, the energy storage device 18 then transfers its electrical enegy to the distribution bus 16 to power the downstream electronic equipment, the unidirectional converters $C_i$ being driven by the storage regulating loops $X_i$ so as not to transfer electrical power $P_i$ to the distribution bus 16.

The quantity of energy E then decreases, and the storage voltage $V_{ST}$ drops as far as a region 2, which is an operating region of the power supply system 10 associated with the priority power supply grid $R_1$.

In this region 2 delimited by the storage voltage values $V_{ST1}$ and $V*_{ST}$, the storage regulating loop $X_1$ commands the unidirectional converter $C_1$ such that the storage voltage $V_{ST}$ is kept close to the reference storage voltage $V*_{ST}$. If the storage voltage $V_{ST}$ drops below the reference storage voltage $V*_{ST}$, the storage regulating loop $X_1$ commands the increase in the electrical power $P_1$ such that the storage voltage $V_{ST}$ increases.

Conversely, if the storage voltage $V_{ST}$ exceeds $V*_{ST}$ and penetrates the region 1, the storage regulating loop $X_1$ commands the unidirectional converter such that the electrical power $P_1$ delivered is zero.

In steady state, the electrical powers $P_1, \ldots, P_N$ delivered by the unidirectional converters $C_1, \ldots, C_N$ to the distribution bus 16 correspond to the electrical load power $P_{LOAD}$ delivered as output to the electronic equipment via the distribution voltage $V_{BUS}$. The distribution voltage is then kept at the value of the reference distribution voltage $V*_{BUS}$.

When the input voltage $V_1$ decreases, for example during a breakdown occurring on the power supply grid $R_1$, the electrical power delivered by the unidirectional converter $C_1$ to the distribution bus 16 decreases, which tends to cause the storage voltage $V_{ST}$ to drop. The regulating loop $X_1$ commands the unidirectional converter $C_1$ to increase the electrical power transfer $P_1$ between the power supply grid $R_1$ and the distribution bus 16, potentially up to saturation of the storage regulating loop $X_1$.

The saturation of the storage relating loop $X_i$ corresponds to the command by said loop to the corresponding unidirectional converter $C_i$ of the maximum electrical power $P_i$ transfer between the power supply grid $R_i$ and the distribution bus 16 (the electrical power $P_i$ actually transferred possibly being zero).

If the input voltage $V_1$ disappears, the electrical power $P_1$ delivered by the unidirectional converter $C_1$ to the distribution bus is insufficient to load the energy storage device 18, and the energy storage device 18 discharges while powering the electronic equipment. The storage voltage $V_{ST}$ then decreases as far as a region 3.

This region 3 corresponds to the transparency range 25 of the power supply grid $R_1$ in which the storage regulating loop $X_1$ is saturated, and the other storage regulating loops $X_2, \ldots, X_N$ command their respective unidirectional converter $C_i$ to transfer zero power $P_2, \ldots, P_N$ between the corresponding power supply grid $R_i$ and the distribution bus 16.

As long as the input voltage $V_1$ of the priority power supply grid $R_1$ remains insufficient, the energy storage device 18 discharges and the storage voltage $V_{ST}$ decreases until it moves into a region 4.

In this region 4, delimited by the storage voltage values $V_{ST2}$ and $V*_{ST2}$ and which corresponds to an operating region associated with the power supply grid $R_2$, the storage regulating loop $X_2$ of the priority power supply grid $R_2$ after the priority power supply grid $R_1$ commands the corresponding unidirectional converter $C_2$ to perform a transfer of electrical power $P_2$ toward the distribution bus 16 so that the storage voltage $V_{ST}$ remains close to the value $V*_{ST2}$, i.e. so as to balance the power consumed on the power supply grid $R_2$ and the power supplied to the bus 16.

The storage regulating loop $X_1$ of the priority power supply grid $R_1$ then remains saturated.

The static gain $G_2$ of the storage regulating loop $X_2$ is then defined via the static gain $G_1$ according to the equation $G_2=G_1*V_{ST2}/V_{ST1}$.

As before, if the storage voltage $V_{ST}$ decreases, for example due to the disappearance of the input voltage $V_2$, the storage regulating loop $X_2$ commands the unidirectional converter $C_2$ to increase the power transfer $P_2$ between the power supply grid $R_2$ and the distribution bus 16 so as to provide a surplus of electrical energy to reload the energy storage device 18.

If the storage voltage $V_{ST}$ continues to drop despite the saturation of the storage regulating loop $X_2$, the storage voltage $V_{ST}$ decreases toward a second transparency range 25 that corresponds to the transparency of the power supply grid $R_2$.

If the input voltages $V_1$ or $V_2$ do not reappear, the storage voltage $V_{ST}$ then decreases as far as a region 6 delimited by the storage voltage values $V_{ST3}$ and $V*_{ST3}$. In this region 6, the storage regulating loop $X_3$ commands the unidirectional converter $C_3$ to perform a transfer of electrical power $P_3$ so that the storage voltage $V_{ST}$ is kept close to the value $V*_{ST3}$, i.e. so as to balance the power consumed on the power supply grid $R_3$ and the power supplied to the distribution bus 16.

The storage regulating loops $X_1$ and $X_2$ are still saturated.

However, in the region 4, if the priority power supply grid $R_1$ reappears, i.e. the power supply grid $R_1$, the electrical power $P_1$ transferred to the distribution bus 16 by the unidirectional converters $C_1$ increases gradually from 0.

The storage regulating loop $X_1$ of this grid being saturated, the electrical power simultaneously transferred by the two unidirectional converters $C_1$ and $C_2$ to the distribution bus 16 corresponds to a surplus of electrical energy relative to what the power supply system 10 delivers to the electronic equipment, which results in recharging the energy storage device 18 and increasing the storage voltage $V_{ST}$.

The storage voltage $V_{ST}$ then increases until it climbs out of region 4, i.e. the command by the storage regulating loop $X_2$ to the unidirectional converter $C_2$ to transfer zero electrical power $P_2$ from the power supply grid $R_2$ to the distribution bus 16.

The transfer of electrical power $P_1$ between the priority grid $R_1$ and the distribution bus 16 being maximal, the storage voltage $V_{ST}$ continues to increase until it enters the region 2, which corresponds to the nominal operation of the power supply system 10.

In practice, the power supply system 10 is initially in the region 7, the storage voltage $V_{ST}$ being zero and all of the storage regulating loops Xi being saturated. When less than one power supply grid is available, the saturation of these loops causes the increase in said storage voltage $V_{ST}$ until it enters the operating region associated with the priority power supply grid $R_i$, as described above.

The control logic of the control means 20 is thus done as a function of the quantity of energy E of the energy storage device 18 and simultaneously regulates the electrical power $P_i$ delivered by each unidirectional converter $C_i$ to the distribution bus 16.

This control logic does not rely on the evaluation of the availability of the power supply grids $R_i$ and any switching which, at a given moment, limits the number of power supply grids $R_i$ capable of supplying electricity to the distribution bus 16 to one.

In fact, when the storage voltage $V_{ST}$ is below several storage voltage thresholds $V_{STi}$, the storage regulating loops $X_i$ associated with the power supply grids $R_i$ of storage voltage thresholds $V_{STi}$ higher than the storage voltage $V_{ST}$ are saturated. These power supply grids $R_i$ are thus ready to transfer their electrical power $P_i$ to the distribution bus 16 without delay or switching.

This in particular makes it possible to minimize the amplitude of the transient phases in case of the appearance of one of the power supply grids.

Furthermore, the electrical power $P_i$ supplied by a power supply grid $R_i$ to the distribution bus 16 increases and decreases gradually and continuously, which minimizes disruptions on the power supply grids $R_i$.

Figure 2:
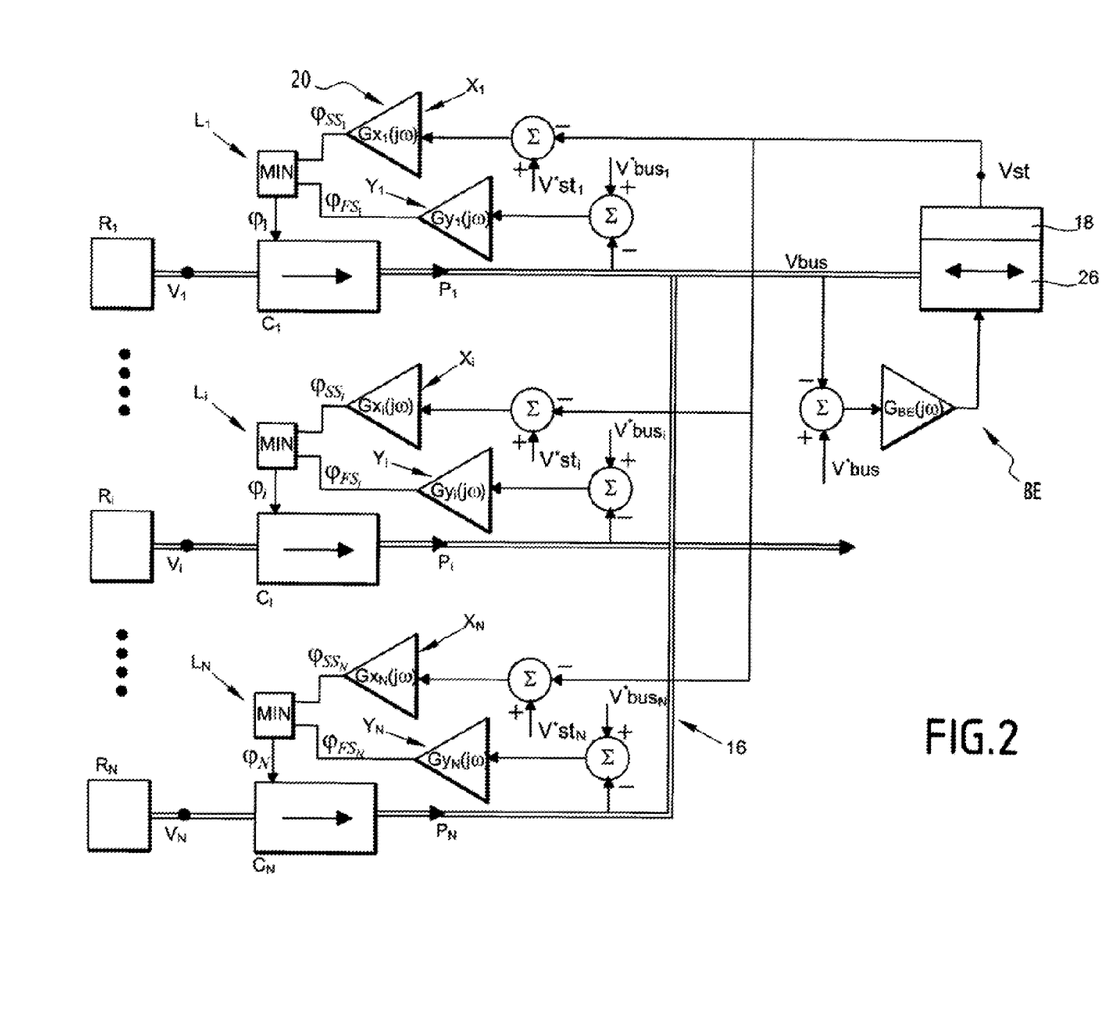
FIG. 2 is a view similar to that of FIG. 1 of a power supply system according to a second embodiment of the invention.

FIG. 2 illustrates a second embodiment of the invention.

In this second embodiment, the power supply system 10 comprises the same elements as above. These will therefore not be described again.

Furthermore, the power supply system 10 includes a two-way loader 26.

The control means 20 include N distribution regulating loops designated by references $Y_1, \ldots, Y_N$ and a loader regulating loop BE capable of driving the loader 26 to subjugate the distribution voltage $V_{BUS}$ to the reference distribution voltage $V^*_{BUS}$.

Furthermore, the control means 20 include N control blocks $L_1, \ldots, L_N$ respectively connected as input to a storage regulating loop $X_i$ and a distribution regulating loop $Y_i$, and as output to the corresponding unidirectional converter $C_i$.

The loader 26 is connected on the one hand to the distribution bus 16 and on the other hand to the energy storage device 18. It is capable of withdrawing electrical power on the distribution bus 16 and delivering it to the energy storage device 18, and vice versa.

The loader 26 is for example made up of a step-down converter controlled synchronously or a common inductance voltage step-down/step-up converter.

The N distribution regulating loops $Y_i$ are adapted to control the electrical power $P_i$ delivered by the unidirectional converters $C_i$ to the distribution bus 16 as a function of the distribution voltage $V_{BUS}$. This control is done by each distribution regulating loop $Y_i$ via a second control variable $\phi_{FS1}, \ldots, \phi_{FSN}$.

More particularly, the distribution regulating loops $Y_i$ are adapted to control the unidirectional converters $C_i$ to limit the distribution voltage $V_{BUS}$.

To that end, each distribution regulating loop $Y_i$ is associated with a local distribution voltage $V^*_{BUSi}$ such that if the distribution voltage $V_{BUS}$ exceeds the local distribution voltage $V^*_{BUSi}$, the corresponding distribution regulating loop $Y_i$ commands the limitation of the electrical power Pi supplied by the corresponding converter, which in return tends to limit the distribution voltage $V_{BUS}$.

The local distribution voltages $V^*_{BUS1}, \ldots, V^*_{BUSN}$ are strictly decreasing and greater than the reference distribution voltage $V^*_{BUS}$ of the loader regulating loop BE.

When the distribution voltage $V_{BUS}$ is greater than $V^*_{BUS}$, which occurs in particular when several unidirectional converters $C_i$ transfer a non-zero electrical power to the distribution bus 16, the electrical power $P_i$ coming from the priority power supply grid $R_i$ among those power supply grids is thus transferred as a priority to the distribution bus 16.

Each control block $L_i$ is adapted to limit the electrical power $P_i$ delivered by the corresponding unidirectional converter $C_i$ through the selection of the minimum between the first control variable $\phi_{SSi}$ of the storage relating loop $X_i$ and the second control variable $\phi_{FSi}$ of the distribution regulating loop $Y_i$.

Alternatively, the distribution regulating loops $Y_i$ can control the unidirectional converters $C_i$ to limit a distribution current $I_{BUS}$ that they supply to the distribution bus 16.

The operation of the power supply system 10 according to the second embodiment follows from the operation of the invention according to the first embodiment and will now be described, still in reference to FIG. 4.

In this embodiment, aside from the aspects of the operation of the power supply system 10 previously described, the loader 26 withdraws electrical power on the distribution bus 16 when the distribution voltage $V_{BUS}$ exceeds the reference distribution voltage $V^*_{BUS}$ and transfers that electrical power to the energy storage device 18, i.e. it loads the energy storage device 18.

Conversely, when the distribution voltage $V_{BUS}$ drops below its reference value $V^*_{BUS}$, the loader 26 compensates by discharging the energy storage device 18 so as to introduce a surplus of electrical energy onto the distribution bus 16, which tends to increase the distribution voltage $V_{BUS}$.

In reference to FIG. 4, in a region associated with a power supply grid $R_i$, when a priority power supply grid $R_j$ reappears (j is an integer smaller than i), the saturation of the storage regulation loop $X_j$ translates to a rapid increase in the distribution voltage $V_{BUS}$. In order to prevent these excursions of the distribution voltage $V_{BUS}$ on the distribution bus 16 that may harm the downstream electronic equipment, the control block $L_j$ of the unidirectional converter $C_i$ limits the electrical power $P_i$ that it delivers by proceeding as described above.

The control blocks $L_i$ thereby guarantee that the distribution voltage $V_{BUS}$ remains under maximum distribution voltage $V_{BUS\_MAX}$.

It should be noted that the speeds of the distribution regulating loops $Y_i$ are higher than the speeds of the corresponding storage regulating loops $X_i$.

This embodiment is therefore advantageously used to limit the distribution voltage $V_{BUS}$.

Figure 3:
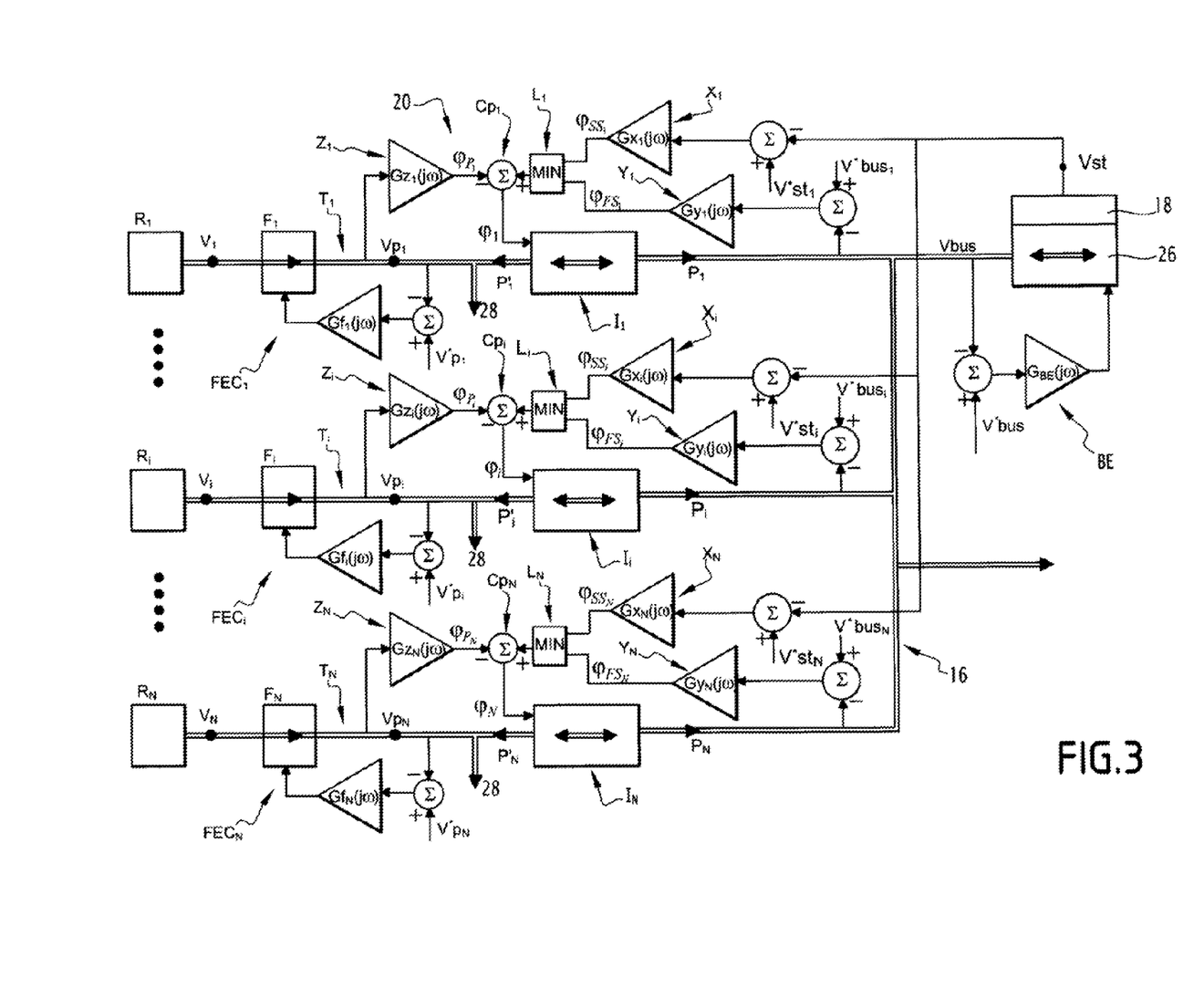
FIG. 3 is a view similar to that of FIG. 3 of a power supply system according to a third embodiment of the invention.

FIG. 3 illustrates a third embodiment of the invention, in which the power supply system 10 has the same members as in the second embodiment; these members therefore will not be described again.

In this third embodiment, each unidirectional converter $C_1, \ldots, C_N$ associated with a given power supply grid has:
an intermediate grid $T_1, \ldots, T_N$,
a unidirectional primary converter $F_1, \ldots, F_N$ and
a two-way insulator $I_1, \ldots, I_N$.

Furthermore, the control means 20 have N positive reaction loops $Z_1, \ldots, Z_N$. Each positive reaction loop $Z_i$ is respectively associated with a given two-way insulator $I_i$.

The primary unidirectional converters $F_i$, hereafter primary converters $F_i$, can prevent transfers of electrical energy between the power supply grid $R_i$ with which they are respectively associated and the other power supply grids.

Each primary converter $F_i$ is connected in input to the corresponding power supply grid $R_i$ and can deliver, to the corresponding intermediate grid $T_i$, an intermediate voltage $V_{Pi}$ regulated at a stipulated intermediate voltage $V^*_{Pi}$, from the input voltage $V_i$ of said power supply grid. Each primary converter $F_i$ is then driven by a primary regulating loop $FEC_i$ to that end.

The primary converters $F_i$ have current rectifying means, means for filtering the input voltage $V_i$ in common mode and in differential mode, as well as protection means against overvoltages and protection means against lightning.

The primary converters $F_i$ are for example of the common inductance voltage step-down/step-up type when the current supplied by the corresponding power supply grid is direct and the input voltage $V_i$ is equal to 28 V or 270 V, and are for example of the Boost PFC type when the supplied current is alternating and the input voltage $V_i$ is equal to 115 V or 230 V.

The two-way insulators $I_i$, hereafter insulators $I_i$, can allow the two-way transfer of electrical energy between the associated intermediate grid $T_i$ and the distribution bus 16. Moreover, the insulators $I_i$ can galvanically insulate the power supply grid $R_i$ with which the unidirectional converter $C_i$ to which they belong is associated from the other power supply grids $R_j$ and power the primary auxiliary equipment (not shown).

Each insulator $I_i$ is connected in input to an intermediate grid $T_i$ and at its output to the distribution bus 16. Via an output 28, the intermediate grid $T_i$ makes it possible to power auxiliary equipment (not shown) and auxiliary circuits (not shown) to which they deliver a polarization current for their operation.

Each positive reaction loop $Z_i$ is associated with a given insulator $I_i$ and can control said insulator $I_i$ to regulate the electrical power $P_i$ that this insulator delivers as a function of the intermediate voltage $V_{Pi}$. This command is done via a third control variable $\phi_{P1}, \ldots, \phi_{PN}$.

Moreover, each positive reaction loop $Z_i$ can control the insulator $I_i$ to regulate an electrical power $P'_i$ transferred by the insulator $I_i$ to the associated intermediate bus $T_i$ from the distribution bus 16.

The electrical power $P'_i$ is used to power electronic equipment via its connection to an intermediate bus $T_i$ whereof the insulator $I_i$ is currently commanded not to transfer electrical power $P_i$ to the distribution bus 16.

In the example of FIG. 3, this for example thus makes it possible to power electronic equipment from an intermediate bus $T_2$ of the unidirectional converter $C_2$, which is also controlled by the storage regulation loop $X_2$ to deliver zero electrical power $P_2$ to the distribution bus 16 during the nominal operation of the power supply system 10.

The insulators $I_i$ are for example made by converters of the Dual Active Bridge type or from Load-Resonant Converters (LRC). They are for example provided with Active Secondary Rectifier devices.

As illustrated in FIG. 3, the regulation of the electrical power $P_i$ delivered by each unidirectional converter $C_i$ to the distribution bus 16 is done via the control of the insulators $I_1, \ldots, I_N$. The control of each insulator $I_i$ is done:
  by the associated storage regulation loop $X_i$ as a function of the storage voltage $V_{ST}$,
  by the associated distribution regulating loop $Y_i$ as a function of the distribution voltage $V_{BUS}$, and
  by the associated positive reaction loop $Z_i$ as a function of the intermediate voltage $V_{Pi}$ of the corresponding intermediate bus $T_i$.

In this third embodiment, the control block $L_i$ and the positive reaction loop $Z_i$ associated with a given unidirectional converter $C_i$ are then connected at their output to a subtracter $C_{Pi}$ capable of controlling the insulator $I_i$ for a transfer of electrical power $P_i$ as a function of three control variables $\phi_{SSi}$, $\phi_{FSi}$ and $\phi_{Pi}$.

The electrical power $P_i$ delivered by each unidirectional converter $C_i$ to the distribution bus 16 is proportional to the difference between the minimum of the first control variable $\phi_{SSi}$ and the second control variable $\phi_{FSi}$ on the one hand, and the third control variable $\phi_{Pi}$ on the other hand, i.e.:

$$P_i \propto \min(\phi_{SSi}; \phi_{FSi}) - \phi_{Pi}.$$

It should be noted that the storage regulation loop $X_i$ of each unidirectional converter $C_i$ is the only regulation loop capable of controlling the electrical power $P_i$ delivered by said insulator $I_i$ upward, the distribution regulating loop $Y_i$ and the positive reaction loop $Z_i$ being adapted to limit that electrical power $P_i$.

The operation of the power supply system 10 according to the third embodiment of the invention follows from the operation of the system 10 according to the second embodiment and will now be described in reference to FIGS. 3, 4 and 5.

Aside from the aspects of the operation of the system 10 according to the second embodiment previously described, during the operation of the power supply system 10 in a region associated with a given power supply grid $R_i$, it happens that the input voltage $V_i$ delivered by the corresponding power supply grid $R_i$ decreases temporarily. Such a phenomenon is called a brown-out.

This voltage drop translates to a decrease in the corresponding intermediate voltage $V_{Pi}$.

Without information pertaining to this input voltage drop $V_i$, the storage $X_i$ and distribution $Y_i$ regulating loops control the corresponding insulator $I_i$ to transfer the same electrical power $P_i$ from the intermediate grid $T_i$ to the distribution bus 16, which can cause the intermediate voltage $V_{Pi}$ to disappear.

The positive reaction loop $Z_i$ of the considered power supply grid $R_i$ then controls the insulator $I_i$ through the increase in the third control variable $\phi_{Pi}$ so that the electrical power $P_i$ supplied to the distribution bus 16 decreases.

The electronic equipment is then powered via both the power supply grid $R_i$, the operation of which is degraded, and the energy storage device 18, as long as the storage voltage remains in the voltage range $[V_{STi}, V^*_{STi}]$.

When the storage voltage is situated in a value range $[V_{STi}, V^*_{STi}]$, corresponding to a power supply grid $R_i$, the intermediate voltage $V_{Pk}$ seen by each primary converter $F_k$ associated with a power supply grid $R_k$ of lower priority than the power supply grid $R_i$ is higher than the stipulated intermediate voltage $V^*_{Pk}$, due to the two-way nature of the insulators $I_k$, with k an integer greater than i.

In fact, the distribution voltage $V_{BUS}$ is seen by the primary converter $F_k$ subject to a transform coefficient and the action of the corresponding positive reaction loop $Z_k$, such that the intermediate voltage $V_{Pk}$ is kept above the stipulated intermediate voltage $V^*_{Pk}$.

The associated primary converters $F_i$ are commanded by their primary regulating loop $FEC_k$ to transfer zero electrical power from the power supply grid $R_k$ to the corresponding intermediate grid $T_k$.

Figure 5:
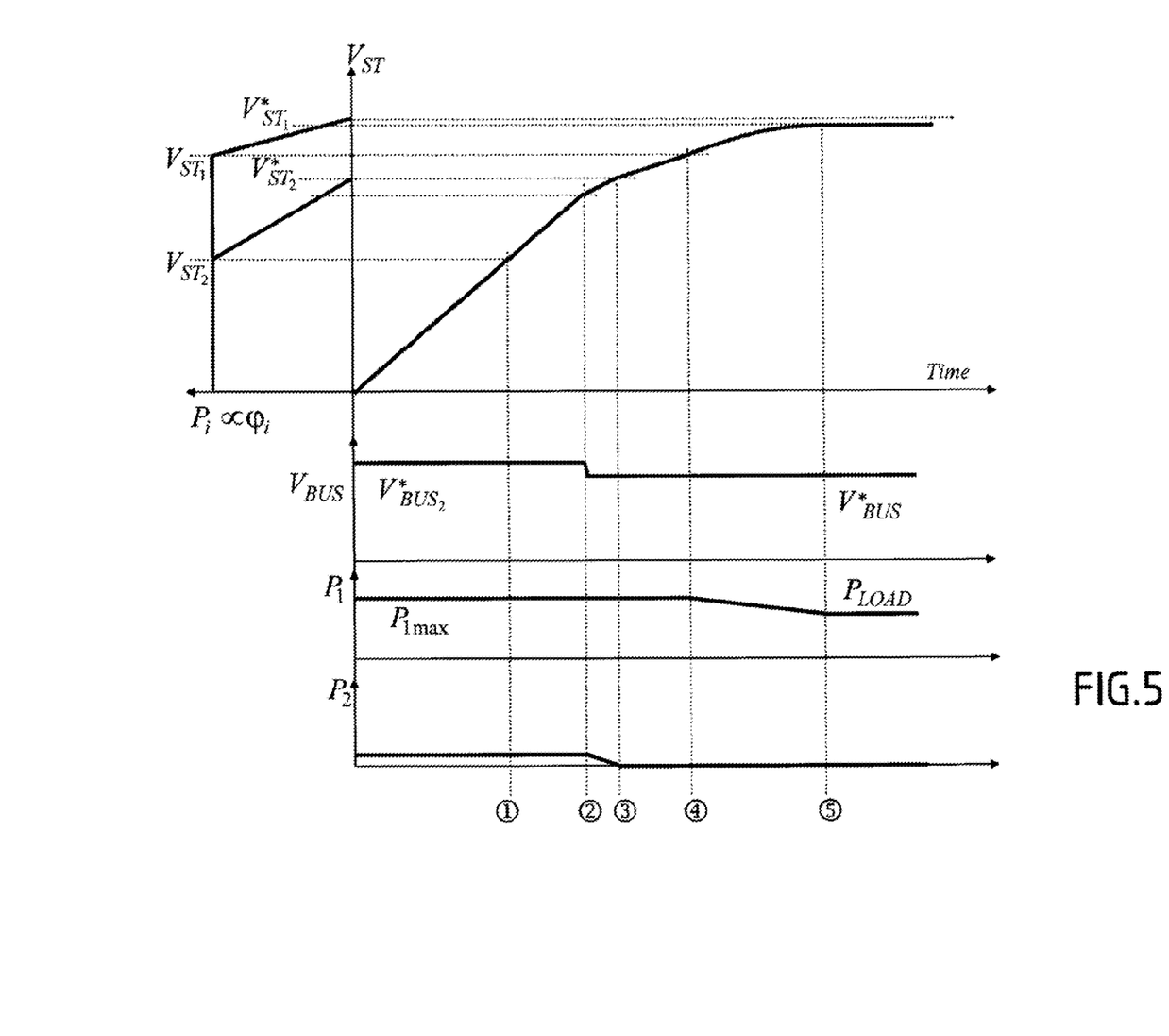
FIG. 5 is a diagrammatic illustration of voltage and power variations during the operation of a power supply system according to the third embodiment.

FIG. 5 is an illustration of the variations of the storage voltage $V_{ST}$, the distribution voltage $V_{BUS}$, and the electrical powers $P_1$ and $P_2$ as a function of time when a power supply system 10 according to the third embodiment of the invention is started up in the event it is connected as input to power supply grids $R_1$, $R_2$ (N=2). In the example of FIG. 5, the appearance of the power supply grids $R_i$ is simultaneous.

Until moment ①, the storage regulating loops $X_i$ are saturated. The unidirectional converter $C_1$ supplies its maximum power, while the converter $C_2$ supplies a power limited by the distribution regulating loop $Y_2$. The distribution voltage $V_{BUS}$ is therefore regulated to the local distribution voltage $V_{BUS2}^*$.

Until moment ②, the power transferred to the distribution bus 16 by the two converters $C_1$ and $C_2$ is limited by the capacity of the loader 26 to absorb electricity. The power supplied by the converter $C_2$ is used to load the storage device 18 more quickly, and is significantly smaller than the nominal power of the unidirectional converter $C_2$.

After moment ②, the storage regulating loop $X_2$ begins to desaturate. The power supplied by the converter $C_2$ gradually decreases. The distribution voltage $V_{BUS}$ rapidly converges toward the reference $V_{BUS}*$ defined by the loop BE.

At moment ③, the converter $C_2$ is commanded for zero transferred power $P_2$. The converter $C_1$ continues to supply its maximum power, supplying both the downstream load and increasing the storage voltage $V_{ST}$.

At moment ④, the storage voltage $V_{ST}$ is equal to $V_{ST1}$ and the storage regulation loop $X_1$ begins to desaturate. The electrical power $P_1$ supplied by the converter $C_1$ converges toward the load power $P_{LOAD}$ consumed by the load.

At moment ⑤, the system is balanced and the converter $C_1$ supplies an electrical power $P_1$ equal to the load power $P_{LOAD}$ consumed by the load.

Alternatively, the energy storage device 18 is an inductive storage device passed through by a storage current $I_{ST}$ representative of a quantity of electricity E that it contains.

In this alternative, the control means 20 can simultaneously control the unidirectional converters $C_i$ to regulate the electrical power $P_i$ delivered by each of said unidirectional converters 14 as a function of the storage current $I_{ST}$.

While the foregoing is directed to embodiments of the present invention, other and further embodiments of the invention may be devised without departing from the basic scope thereof, and the scope thereof is determined by the claims that follow.

The invention claimed is:

1. A power supply system adapted to be connected in input to N distinct power supply grids ($R_1$, . . . , $R_N$) delivering a direct or alternating input voltage ($V_1$, . . . , $V_N$), and to deliver a direct distribution voltage ($V_{BUS}$), N being an integer greater than or equal to 2, of the type comprising:
 a distribution bus operating under the distribution voltage ($V_{BUS}$),
 N unidirectional converters ($C_1$, . . . , $C_N$) adapted to be respectively connected in input to a given power grid ($R_1$, . . . , $R_N$) and adapted to deliver an electrical power ($P_1$, . . . , $P_N$) to the distribution bus, and
 control means adapted to control the unidirectional converters ($C_1$, . . . , $C_N$),
 characterized in that the power supply system also includes an energy storage device connected to the distribution bus and having a quantity of energy (E), and in that the control means are adapted to control the unidirectional converters ($C_1$, . . . , $C_N$) simultaneously to regulate the electrical power ($P_1$, . . . , $P_N$) delivered by each of said unidirectional converters ($C_1$, . . . , $C_N$), according to a priority order between the power supply grids determined as a function of the quantity of energy (E).

2. The power supply system according to claim 1, characterized in that the energy storage device is a capacitive storage device operating under a storage voltage ($V_{ST}$) representative of the quantity of energy (E), the control means being adapted to control the unidirectional converters ($C_1$, . . . , $C_N$) simultaneously to regulate the electrical power ($P_1$, . . . , $P_N$) delivered by each of said unidirectional converters ($C_1$, . . . , $C_N$) as a function of the storage voltage ($V_{ST}$).

3. The power supply system according to claim 1, characterized in that the energy storage device is an inductive storage device passed through by a storage current ($I_{ST}$), the control means being adapted to control the unidirectional converters ($C_1$, . . . , $C_N$) simultaneously to regulate the electrical power ($P_1$, . . . , $P_N$) delivered by each of said unidirectional converters ($C_1$, . . . , $C_N$) as a function of the storage current ($I_{ST}$).

4. The power supply system according to claim 2, characterized in that decreasing storage voltage thresholds ($V_{ST1}$, . . . , $V_{STN}$) are associated with the power supply grids ($R_1$, . . . , $R_N$) and define a priority order between said power supply grids ($R_1$, . . . , $R_N$) such that a first power supply grid ($R_1$, . . . , $R_N$) whereof the storage voltage threshold ($V_{ST1}$, . . . , $V_{STN}$) is higher than the storage voltage threshold ($V_{ST1}$, $V_{STN}$) of a second power supply grid ($R_1$, . . . , $R_N$), is given a higher priority relative to said second power supply grid ($R_1$, . . . , $R_N$).

5. The power supply system according to claim 4, characterized in that the control means comprise N storage regulating loops ($X_1$, . . . , $X_N$) respectively associated with a unidirectional converter ($C_1$, . . . , $C_N$) and capable of regulating the electrical power ($P_1$, . . . ,$P_N$) delivered by said unidirectional converter ($C_1$, . . . ,$C_N$) to the distribution bus, each storage regulating loop ($X_1$, . . . , $X_N$) comprising a progressive reduction control characteristic beyond a voltage threshold ($V_{ST1}$, . . . , $V_{STN}$) associated with the corresponding power supply grid ($R_1$, . . . , $R_N$), the slope of said progressive reduction corresponding to the static gain ($G_i$) of said storage regulating loop ($X_1$, . . . , $X_N$).

6. The power supply system according to claim 5, characterized in that the progressive reductions of the control characteristics of the N storage regulating loops ($X_1$, . . . ,$X_N$) are done over value ranges of the storage voltage ($V_{ST}$) that are disjoint from one another.

7. The power supply system according to claim 5, characterized in that the maximum value ($\phi_{S-MAX}$) of the control characteristic of a storage regulating loop ($X_1$, . . . ,$X_N$) is also the maximum value of the control characteristics of the N-1 other storage regulating loops ($X_1$, . . . ,$X_N$).

8. The power supply system according to claim 5, characterized in that the respective static gains ($G_i$) of the N storage regulating loops ($X_1$, . . . , $X_N$) have decreasing values, the static gain ($G_1$, . . . ,$G_N$) of a storage regulating loop ($X_1$, . . . $X_N$) whereof the unidirectional converter ($C_1$, . . . ,$C_N$) is associated with a first power supply grid ($R_1$, $R_N$) being smaller than the static gain ($G_1$, . . . ,$G_N$) of the storage regulating loop ($X_1$, . . . , $X_N$) whereof the unidirectional converter ($R_1$, . . . ,$R_N$) is associated with a power supply grid ($R_1$, . . . , $R_N$) with a higher priority relative to said first power supply grid ($R_1$, . . . , $R_N$).

9. The power supply system according to claim 8, characterized in that the static gain ($G_1$ ,. . . , $G_N$) of a storage regulating loop ($X_1$, . . . , $X_N$) whereof the unidirectional converter ($C_1$, . . . , $C_N$) is associated with a first power supply grid ($R_1$, . . . , $R_N$) is determined by the equation $G_i=G_{i-1}*V_{STi}$ I$V_{STi-1}$ where $G_i$ is the static gain ($G_1$, . . . $G_N$) of said storage regulating loop ($X_1$, . . . , $X_N$), $V_{STi}$ is the storage voltage threshold associated with said first power supply grid ($R_1$, . . . , $R_N$), $V_{STi-1}$ is the smallest of the storage voltage thresholds higher than the storage voltage threshold $V_{STi}$, and $G_{i-1}$ is the static gain ($G_1$ $G_N$) of the storage regulating loop ($X_1$, . . . , $X_N$) whereof the unidirectional converter ($C_1$, . . . , $C_N$) is associated with the power supply grid ($R_1$, . . . , $R_N$) whereof the storage voltage threshold is $V_{STi-1}$.

10. The power supply system according claim 1, characterized in that the control means have N distribution regulating loops ($Y_1, \ldots, Y_N$) respectively associated with a given unidirectional converter ($C_1, \ldots, C_N$) and capable of regulating the electrical power ($P_1, \ldots, P_N$) delivered by said unidirectional ($C_1, \ldots, C_N$) converter to the distribution bus (16) as a function of the distribution voltage ($V_{BUS}$) to limit the distribution voltage ($V_{BUS}$) or to limit a distribution current ($I_{BUS}$) supplied to the distribution bus.

11. The power supply system according to claim 1, characterized in that each unidirectional converter ($C_1, \ldots C_N$) associated with a given power supply grid ($R_1, \ldots, R_N$) includes:

an intermediate grid ($T_1, \ldots, T_N$), a unidirectional primary converter ($F_1, \ldots, F_N$) capable of preventing electrical power transfers between the power supply grid ($R_1, \ldots, R_N$) with which said unidirectional converter ($C_1, \ldots, C_N$) is associated and the other power supply grids ($R_1, \ldots, R_N$), said unidirectional primary converter ($C_1, \ldots, C_N$) being connected in input to the corresponding power supply grid ($R_1, \ldots, R_N$) and capable of delivering to the intermediate grid ($T_1, \ldots, T_N$) a regulated intermediate voltage ($V_{P1}, \ldots, V_{PN}$) from the input voltage ($V_1, \ldots, V_N$) of said power supply grid, and a bidirectional insulator ($I_1, \ldots, I_N$) capable of galvanically insulating the power supply grid ($R_1, \ldots, R_N$) with which said unidirectional converter ($C_1, \ldots C_N$) is associated from the other power supply grids ($R_1, \ldots, R_N$), said bidirectional insulator ($I_1, \ldots, I_N$) being connected in input to the intermediate grid ($T_1, \ldots, T_N$) and at its output to the distribution bus (16), and being capable of being controlled by the control means (20) to regulate the electrical power ($P_1, \ldots, P_N$) delivered by the unidirectional converter ($C_1, \ldots, C_N$) to the distribution bus and to regulate electrical power ($P'_1, P'_N$) coming from the distribution bus and delivered by said bidirectional insulator ($I_1, \ldots, I_N$) to the corresponding intermediate bus ($T_1, \ldots, T_N$).

12. The power supply system according to claim 11, characterized in that the primary converters ($F_1, \ldots, F_N$) include rectifier means for the voltage, filtering means for the voltage in common mode and differential mode, protection means against overvoltages, and protection means against lightning.

13. The power supply system according to claim 11, characterized in that the control means have N positive reaction loops ($Z_1, \ldots, Z_N$) respectively associated with a given bidirectional insulator ($I_1, \ldots, I_N$) and capable of regulating, as a function of the intermediate voltage ($V_{P1}, \ldots, V_{PN}$) of the corresponding intermediate grid ($T_1, \ldots, T_N$), the electrical power ($P_1, \ldots, P_N$) delivered by said bidirectional insulator to the distribution bus, and therefore by the corresponding unidirectional converter ($C, \ldots C_N$) to the distribution bus, on the one hand, and the electrical power ($P'_1, \ldots, P'_N$) delivered by said bidirectional insulator ($I_1, \ldots, I_N$) to the corresponding intermediate bus ($N_1, \ldots, N_N$) on the other hand.

14. The power supply system according to claim 5, characterized in that for each unidirectional converter ($C_1, \ldots, C_N$), the associated storage regulating loop ($X_1, \ldots, X_N$) is capable of regulating the electrical power ($P_1, \ldots, P_N$) delivered by said unidirectional converter ($C_1, \ldots, C_N$) as a function of the storage voltage ($V_{ST}$) via a first control variable $\phi_{SS1}, \ldots, \phi_{SSN}$) the associated distribution regulating loop ($Y_1, \ldots, Y_N$) is capable of regulating the electrical power ($P_1, \ldots, P_N$) delivered by said unidirectional converter ($C_1, \ldots, C_N$) as a function of the distribution voltage ($V_{BUS}$) via a second control variable ($\phi_{FS1}, \ldots, \phi_{FSN}$) and the associated positive reaction loop ($Z_1, \ldots, Z_N$) is capable of regulating the power delivered by said unidirectional converter via a third control variable ($\phi_{P1}, \ldots, \phi_{PN}$), the power delivered by said unidirectional converter ($P_1, \ldots, P_N$) to the distribution bus being proportional to the difference between the minimum of the first ($\phi_{SS1}, \ldots, \phi_{SSN}$) and second ($\phi_{FS1}, \ldots, \phi_{FSN}$) control variables on the one hand, and the third control variable on the other hand ($\phi_{P1}, \ldots, \phi_{PN}$).

15. The power supply system according to claim 1, characterized in that the energy storage device is connected to the distribution bus via a two-way loader capable of transferring electric energy between the distribution bus and the energy storage device.

16. The power supply system according to claim 15, characterized in that the energy storage device comprises a loader regulating loop (BE) capable of controlling the two-way loader to regulate the transfer of electrical energy between the two-way loader and the distribution bus to slave the distribution voltage ($V_{BUS}$) to a reference distribution voltage ($V^*_{BUS}$).

* * * * *